Nov. 9, 1926.　　　　　　　　　　　　　　　　1,606,713
J. E. McQUEEN
DIRIGIBLE SPOTLIGHT
Filed Dec. 20, 1924

Inventor
James E. McQueen,
By
Attorney

Patented Nov. 9, 1926.

1,606,713

UNITED STATES PATENT OFFICE.

JAMES E. McQUEEN, OF DUNBAR, SOUTH CAROLINA.

DIRIGIBLE SPOTLIGHT.

Application filed December 20, 1924. Serial No. 757,203.

The object of the invention is to provide a spotlight adapted to be supported intermediately between the headlights of a vehicle and to be controlled from the steering mechanism of the latter so that its beams may be cast always in a direction parallel to the direction of movement of the forward or steering wheels; and to provide means precluding too free turning movement in order that the spotlight may not be oscillated during the movement of the vehicle.

With this object in view, the invention consists in the construction and combination of parts of which a preferred embodiment is illustrated in the accompanying drawings, wherein.

Figure 1:
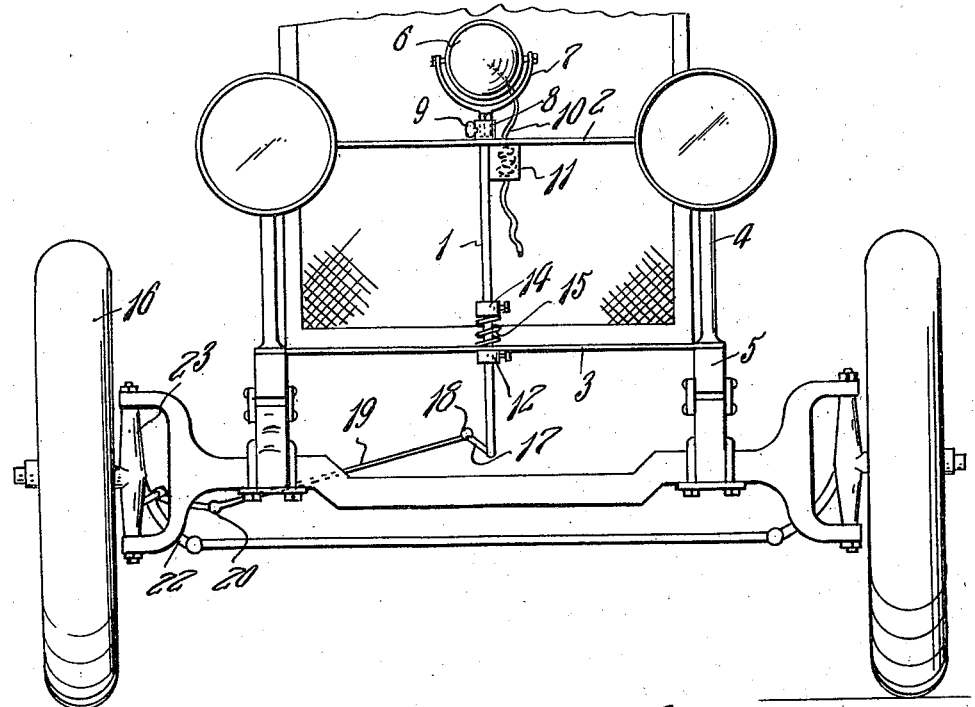
Figure 1 is a front elevational view of a vehicle with the invention applied in operative position thereon.
Figure 2:
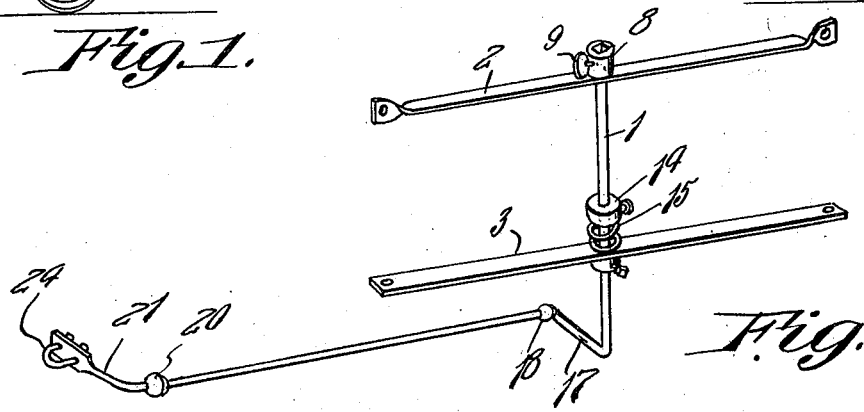
Figure 2 is a perspective view illustrating the operating mechanism of the spotlight.

The standard 1 which supports the spotlight is rotatably mounted in the transverse brace rods 2 and 3, the former of which spans the headlight standard 4 and the latter of which spans the frame 5, the brace rods or bars being connected respectively to the standard and to the frame.

The spotlight 6 is supported in the fork 7, the stem of which is carried in a socket 8 at the upper end of the standard 1 and is removably secured in the standard by means of a wing nut 9, so that it may be removed and the stem used as a handle in the employment of the spotlight as a trouble light.

The spotlight bulb is fed through a flexible cable 10 reeled upon an appropriate roller in a casing 11 supported on the under face of the brace bar or rod 2, so that when the spotlight is used as a trouble light, the cable may be unreeled from the roller in order that the light may be carried to any point desired around the vehicle.

To prevent rattling in use, the standard carries the collars 12 and 14, the former abutting the brace bar 3 on the under face and the latter being spaced from the upper face of the brace bar for abutting engagement with a compression spring 15 bearing at one end upon the upper face of the brace bar 3 and at the other end upon the lower face of the collar 14.

To provide for turning the spotlight in the direction of movement of the front or steering wheels 16, the standard 1 is provided with a rearwardly directed right angular arm 17 connected by means of a universal joint 18 with an actuating rod 19 having a universal joint 20 connecting it with an arm 21 which is secured to the stem 22 of the steering knuckle 23 by means of a U-bolt 24.

The invention having been described, what is claimed as new and useful is:

A device for the purpose indicated comprising, in combination with a vehicle, spaced brace bars disposed transversely of the vehicle, a standard rotatably mounted in said brace bars, means connecting the standard with the steering mechanism of the vehicle to impart angular or turning movement to the standard upon corresponding movement being imparted to the steering wheels, and means to prevent rattling of the standard consisting of spaced collars mounted on the latter respectively above and below one of the brace bars, one of the collars abutting the brace bar, and a spring in surrounding relation to the standard and compressed between the brace bar and the other collar.

In testimony whereof he affixes his signature.

JAMES E. McQUEEN.